Dec. 9, 1930.  H. J. TYNAN  1,784,258
TWINE HOLDER AND CUTTER
Filed Feb. 23, 1929
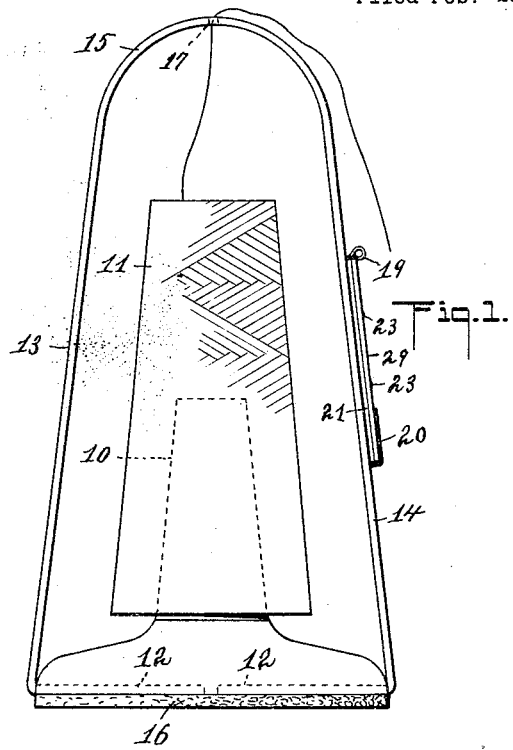
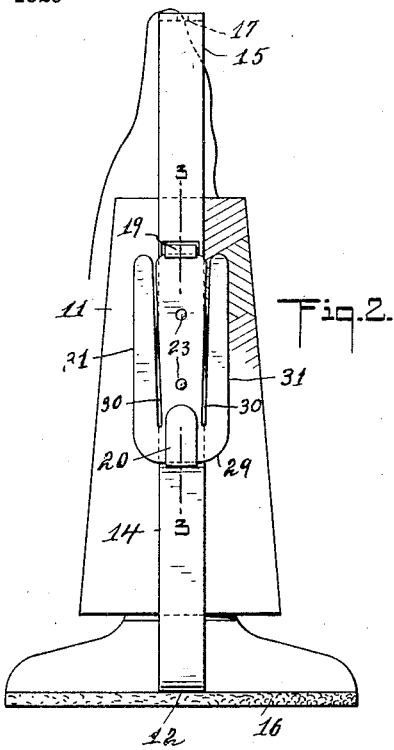
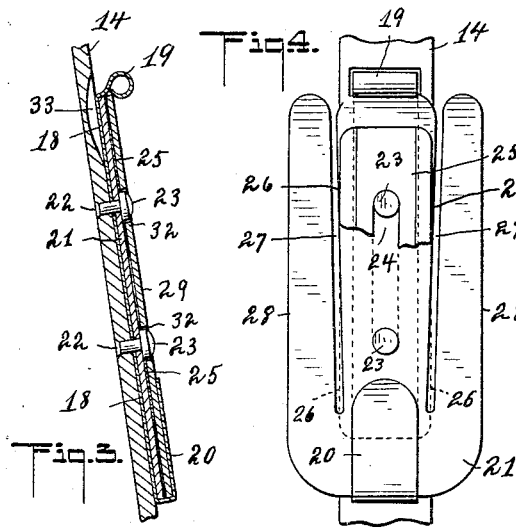
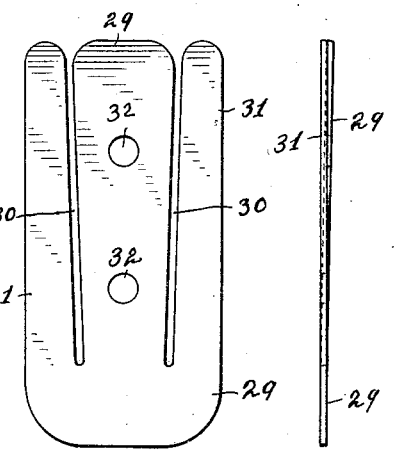
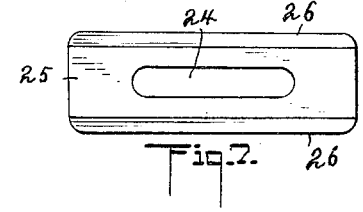
INVENTOR
HENRY J. TYNAN
BY
Charles R. Searle,
ATTORNEY Patented Dec. 9, 1930

1,784,258

UNITED STATES PATENT OFFICE.

HENRY J. TYNAN, OF RIDGEWOOD, NEW JERSEY

TWINE HOLDER AND CUTTER

Application filed February 23, 1929. Serial No. 342,101.

The invention relates to holders adapted to support a ball, tube, or conically wound mass of twine upon a desk or counter or the like in position to deliver the twine as required, and a twine cutting device mounted on the holder and conveniently presented to sever the freed length of twine drawn from the ball or mass, and the object of the invention is to provide an efficient and attractive holder in which the twine is reliably held in position for service and the free end guided for ready delivery.

A further object is to provide a cutter having a readily removable blade, carried on the frame of the holder and conveniently presented to sever the required length of twine drawn from the mass, and which shall be simple in construction and operation.

The invention consists in certain novel features and details of construction and arrangement of parts by which the above and other objects are attained, to be hereinafter described and claimed.

The accompanying drawings form a part of this specification and show the invention as it has been carried out in practice.

Figure 1 is a side elevation of the holder and cutter.

Figure 2 is a corresponding front elevation.

The succeeding figures are on a larger scale and show the cutter in detail.

Figure 3 is a vertical section taken on the line 3—3 in Figure 2 showing a portion of the frame of the holder and the cutting device mounted thereon.

Figure 4 is a face view of the cutting device with the cover-plate removed to show the cutting blade, the latter shown as broken and partly in dotted lines.

Figure 5 is a face view of the cover-plate.

Figure 6 is an edge view of the same.

Figure 7 is a face view of the blade.

Similar reference numerals indicate the same parts in all the figures.

The base 9 of the holder is preferably of metal or hardwood in the ornamental circular form shown, having a vertical tapered extension 10 located centrally thereof and adapted to match the interior cavity of the conical mass of twine 11 to support it on the base. The lower face of the base is grooved transversely to receive the horizontal feet 12 of a frame which may be of wire but is preferably a strip of metal comprising the upwardly extended legs 13 and 14 joined by a semicircular upper portion 15. The frame encloses the base and mass of twine and is secured to the former by the feet 12. A circular pad 16 of felt or the like cemented upon the under face of the base serves as a protection to the counter or desk surface, not shown, on which the holder is movably mounted and also conceals the feet 12.

An opening 17 in the upper portion 15 of the frame receives the free end of the twine 11 and guides its delivery from the mass.

The cutting device is mounted on the leg 14. It has a narrow strip 18 of spring brass or the like extending along the face of the leg and having an outwardly projecting cylindrical upper end 19 and an upwardly projecting hook 20 at the lower end. Upon the strip 18 is mounted a base-plate 21 held to the strip and to the leg 14 by rivets 22 having outwardly protruding heads 23 arranged to serve as bosses and engage the opening or slot 24 or other perforations in a thin blade 25 having two opposite cutting edges 26 and which may be the blade of a safety razor. The cutting edges of the blade extend parallel with the leg 14, and the base-plate 21 is formed with downwardly extending slits or long narrow notches 27 open at the upper end of the base-plate and inclined slightly inwardly toward the centre line of the blade so that the cutting edges of the blade overlap the slits at the lower portions of the latter as shown in Figure 4.

The slitting of the base-plate 21 produces a tongue 28 at each side extending laterally beyond and protecting the cutting edges of the blade, and the latter is held reliably in place by a removable cover-plate 29 corresponding in shape to the base-plate 21 and having similar slits 30 and tongues 31.

Holes 32 loosely receive the heads 23 of the rivets 22 which serve as bosses to maintain the cover-plate with its slits 30 in register with the slits 27 of the base-plate, and the cover-plate is applied by inserting its lower portion in the hook 20, engaging the holes 32 with the rivet heads or bosses 23 and engaging its upper edge with the cylindical end 19 of the strip 18 serving as a spring catch to retain the cover-plate removably in place. A recess 33 in the leg 14 of the frame permits the spring catch 19 to be moved inwardly to release the cover-plate when desired in removing or replacing the cutting blade.

The tongues 31 of the cover-plate 29 are bent slightly inward or given a "set" toward the tongues 28 of the base-plate 21 so that when the cover-plate is applied in position the tongues 31 at their upper extremities will press firmly upon the tongues 28 at their upper ends and prevent the accidental entrance of the cord or twine between the tongues, and the open ends of the slits or notches 27 and 30 in both plates are rounded to facilitate the entrance of the twine to the slits and blade.

In operation, a cone of twine is mounted upon the tapered extension 10 of the base of the holder and held thereon by friction, and the free end of the twine passed through the guide opening 17 and thus drawn as required in tieing a parcel. The twine is then severed by drawing it downwardly in either of the slits, leaving the free end conveniently exposed for the next requirement.

By mounting the cutting device upon the holder it is always readily available, and in transporting the holder from one location to another,—in which the curved upper end of the frame serves as a convenient handle,—the cutter accompanies the holder.

In removing the cutting blade it is only necessary to release the cover-plate 29, remove the blade 25, apply a fresh blade, and re-insert the cover-plate and snap it into place.

Although it is preferable to mount the cutting device upon the leg of the holder it may be differently located or may be secured independently of the holder at any convenient point upon the counter or table.

I claim:—

1. In a twine cutter, a base-plate having two separated vertically inclined slits open at their upper ends, bosses on said base-plate, a cover-plate similarly slitted to match said base-plate and having openings receiving said bosses, a blade arranged for engagement with said bosses and having opposite parallel cutting edges partially overlapping said slits at the lower ends of the latter, an outwardly and upwardly projecting hook attached to the lower end of said base-plate for the reception of the lower end of said cover-plate, and a spring catch at the upper end of said base-plate for detachably engaging the upper end of said cover-plate.

2. In a twine holder having an upwardly extending leg member, a base plate having two separated vertically inclined slits open at their upper ends, bosses on said base plate, a cover plate similarly slitted to match said base plate, and having openings receiving said bosses, a blade arranged for engagement with said bosses and having opposite parallel cutting edges partially overlapping said slits at the lower ends of the latter, an outwardly and upwardly projecting hook attached to the leg for the reception of the lower of the base plate and said cover plate, and a spring catch on said leg and disposed at the upper end of the base plate for detachably engaging the upper end of said cover plate.

In testimony that I claim the invention above set forth, I affix my signature hereto.

HENRY J. TYNAN.